(12) United States Patent
Takeuchi

(10) Patent No.: US 9,635,263 B2
(45) Date of Patent: Apr. 25, 2017

(54) OPTICAL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/996,654

(22) Filed: Jan. 15, 2016

(65) Prior Publication Data

US 2016/0212344 A1    Jul. 21, 2016

(30) Foreign Application Priority Data

Jan. 19, 2015 (JP) ................................. 2015-007502

(51) Int. Cl.
*H04N 5/232* (2006.01)
*G02B 27/64* (2006.01)

(52) U.S. Cl.
CPC ......... *H04N 5/2328* (2013.01); *G02B 27/646* (2013.01); *H04N 5/23258* (2013.01); *H04N 5/23264* (2013.01)

(58) Field of Classification Search
None
See application file for complete search history.

(56) References Cited

U.S. PATENT DOCUMENTS

| | | | |
|---|---|---|---|
| 8,514,290 B2 * | 8/2013 | Takeuchi | G02B 27/646 348/169 |
| 2011/0317024 A1 * | 12/2011 | Miyasako | H04N 5/23254 348/208.11 |
| 2013/0063615 A1 * | 3/2013 | Takeuchi | H04N 5/23258 348/208.5 |
| 2013/0162848 A1 * | 6/2013 | Miyasako | H04N 5/23287 348/208.1 |
| 2015/0256753 A1 * | 9/2015 | Shibata | H04N 5/2328 348/208.3 |
| 2015/0281581 A1 * | 10/2015 | Sakurai | H04N 5/23287 348/208.2 |

(Continued)

FOREIGN PATENT DOCUMENTS

JP         2010-231043 A       10/2010

*Primary Examiner* — Shahbaz Nazrul
(74) *Attorney, Agent, or Firm* — Cowan, Liebowitz & Latman, P.C.

(57) ABSTRACT

A control apparatus includes an estimator configured to estimate a position of a blur correcting lens based on a control amount in accordance with a difference between a target position and a current position, and a numerical model, and to output a first position signal, a first extractor configured to extract a first frequency band of the first position signal, a second extractor configured to extract a second frequency band of a second position signal that is output from a detector configured to detect the position of the blur correcting lens, a combiner configured to combine a signal extracted by the first extractor and a signal extracted by the second extractor, and a controller configured to control driving of the blur correcting lens to move to the target position based on a third position signal combined by the combiner.

9 Claims, 7 Drawing Sheets

(56) References Cited

U.S. PATENT DOCUMENTS

2015/0301353 A1* 10/2015 Takeuchi ............. G02B 27/646
  359/554
2015/0309329 A1* 10/2015 Shibata .............. H04N 5/23258
  359/557
2016/0261806 A1* 9/2016 Honjo ................ H04N 5/23209

* cited by examiner

OPTICAL APPARATUS, CONTROL METHOD, AND NON-TRANSITORY COMPUTER-READABLE STORAGE MEDIUM

BACKGROUND OF THE INVENTION

Field of the Invention

The present invention relates to an optical apparatus, and particularly to an optical apparatus that controls a blur correcting lens based on an output from a detector configured to detect the position of the blur correcting lens through a magnetic component.

Description of the Related Art

An object image in an image captured by an image pickup apparatus such as a digital camera may suffer blurs or so-called hand blurs, for example, when hands of a user holding the camera body shake in the image pickup. For this reason, the digital camera can serve to correct any blurs in the object image in the image caused by the shakes applied to the camera body. A conventional blur correcting means is optical image blur correcting processing that cancels any image blurs.

In the optical image blur correcting processing, an angular velocity sensor initially detects the vibration applied to the camera body. Then, a blur correcting lens provided in an image-pickup optical system that forms an object image is moved based on the detection result to shift the optical axis of this image-pickup optical system. As a result, an image formed on a light-receiving surface of an image sensor moves, and the image blur is corrected.

One known method of detecting the position of the blur correcting lens uses a magnet attached to a mobile member and a magnetic sensor such as a Hall sensor. It is conventional to use a voice coil motor (hereinafter, referred to as a VCM) to drive the mobile member. The VCM is also driven by a magnetic field produced by a magnet and a coil. Therefore, when the Hall sensor and the VCM are disposed close to each other, a Hall element detects not only the magnetism produced by the magnet but also the magnetism produced by the coil of the VCM, and thus the position of the mobile member cannot be correctly detected. One conventional solution is to mechanically arrange the Hall sensor and the coil far from each other, but leads to increase in the size and cost of the image pickup apparatus.

Japanese Patent Laid-Open No. ("JP") 2010-231043 proposes a method of controlling driving of a mobile member using a signal after a magnetic component canceler configured to cancel induced magnetism produced by a coil cancels the induced magnetism.

According to the method disclosed in JP 2010-231043, the magnetic component canceler is, for example, a secondary lowpass filter that handles influence of the induced magnetism on the Hall element. The magnetic component canceler works when there are no characteristic scattering and changes of the induced magnetism, but when an actual characteristic differs from a supposed induced magnetism characteristic due to scattering, the influence of the induced magnetism cannot be completely removed or may be excessively corrected. In an open-loop Bode plot illustrating a driving characteristic of the mobile member, a gain characteristic, which has lowered in a frequency band due to the influence of the induced magnetism, becomes high after the induced magnetism is cancelled, thereby adversely narrowing a gain margin in control. Moreover, driving noises at high frequency are recoded through a microphone of the image pickup apparatus.

SUMMARY OF THE INVENTION

The present invention provides an optical apparatus that can precisely control a blur correcting lens even when a Hall element detects induced magnetism produced from a coil. An optical apparatus according to one aspect of the present invention includes an estimator configured to estimate a position of a blur correcting lens based on a control amount in accordance with a difference between a target position and a current position, and a numerical model, and to output a first position signal, a first extractor configured to extract a first frequency band of the first position signal, which is higher than a predetermined frequency, a second extractor configured to extract a second frequency band of a second position signal that is output from a detector configured to detect the position of the blur correcting lens, which is equal to or lower than the predetermined frequency, a combiner configured to combine a signal extracted by the first extractor and a signal extracted by the second extractor, and a controller configured to control driving of the blur correcting lens to move to the target position based on a third position signal combined by the combiner.

DESCRIPTION OF THE EMBODIMENTS

Exemplary embodiments of the present invention will be described below with reference to the accompanied drawings.

First Embodiment

Figure 1:
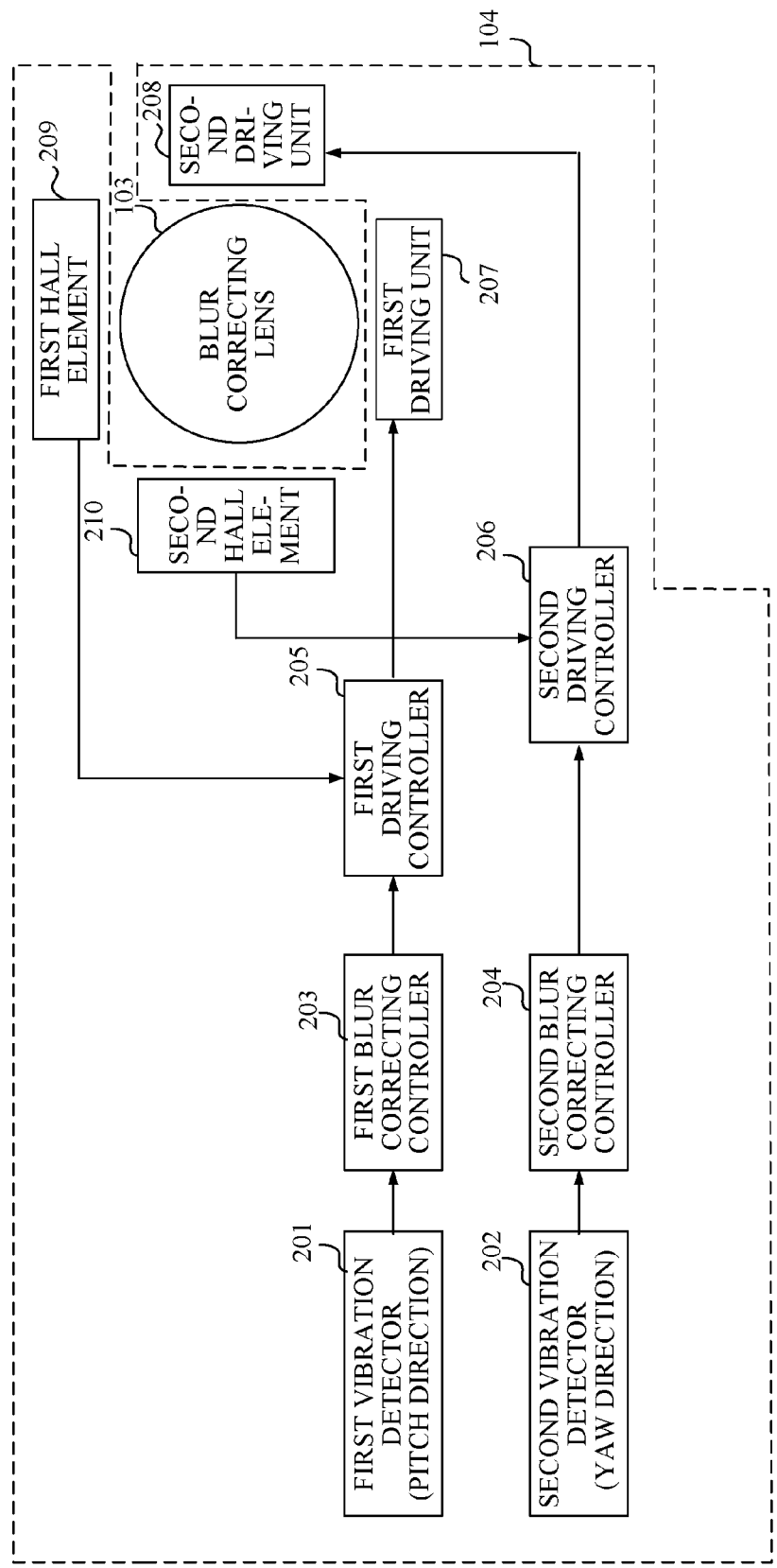
FIG. 1 is a block diagram of an exemplary configuration of a blur correcting lens driving unit according to an embodiment of the present invention.

FIG. 1 is a block diagram of a functional exemplary configuration in which a control apparatus according to this embodiment of the present invention is applied to a blur correcting lens driving unit 104 (driving apparatus) provided to an image pickup apparatus according to this embodiment of the present invention. The image pickup apparatus according to this embodiment includes an image-pickup optical system including a blur correcting lens 103, and an image sensor that receives light passing through the image-pickup optical system, and further includes a blur correcting apparatus (driving apparatus) that drives the blur correcting lens 103 in a direction orthogonal to an optical axis. This embodiment will describe a lens-integrated image pickup apparatus, but the present invention is not limited thereto, and is applicable to a lens interchangeable image pickup apparatus in which an interchangeable lens (optical apparatus) is detachably attached to an image pickup apparatus body.

A first vibration detector 201 is, for example, an angular velocity sensor that detects a vibration of the image pickup apparatus in a normal orientation (in which the length direction of an image is substantially aligned with the horizontal direction) in the vertical direction (pitch direction). A second vibration detector 202 is, for example, an angular velocity sensor that detects a vibration of the image pickup apparatus in the normal orientation in the horizontal direction (yaw direction). A first blur correcting controller 203 and a second blur correcting controller 204 are respectively output correction-position control signals for the blur correcting lens 103 (mobile member) in the pitch direction and the yaw direction so as to control driving of the blur correcting lens 103.

A first driving controller 205 drives a first driving unit 207 as an actuator under feedback control based on the correction-position control signal in the pitch direction output from the first blur correcting controller 203, and position information of the blur correcting lens in the pitch direction output from a first Hall element 209. Similarly, a second driving controller 206 drives a second driving unit 208 as an actuator under feedback control based on the correction-position control signal in the yaw direction output from the second blur correcting controller 204, and position information of the blur correcting lens in the yaw direction output from a second Hall element 210.

Next follows a description of a driving control operation of the blur correcting lens 103 by the blur correcting lens driving unit 104 illustrated in FIG. 1.

The first and second blur correcting controllers 203 and 204 receive, from the first and second vibration detectors 201 and 202, vibration signals (angular velocity signals) representing vibrations of the image pickup apparatus in the pitch and yaw directions. The first and second blur correcting controllers 203 and 204 respectively produce correction-position control signals for driving the blur correcting lens 103 in the pitch and yaw directions based on these vibration signals, and output these correction-position control signals to the first and second driving controllers 205 and 206.

The first and second Hall elements 209 and 210 output, as the position information of the blur correcting lens 103 in the pitch and yaw directions, signals having voltages corresponding to the strength of a magnetic field exerted by a magnet provided to the blur correcting lens 103. In this manner, the first and second Hall elements 209 and 210 each serve as a detector that detects the position of the blur correcting lens 103 (mobile member). The position information (position signals) output from these detectors is supplied to the first and second driving controllers 205 and 206, and the first and second blur correcting controllers 203 and 204. The first driving controller 205 performs feedback control by driving the first driving unit 207 so that the value of a signal from the first Hall element 209 converges to the value of the correction-position control signal from the first blur correcting controller 203. The second driving controller 206 performs feedback control by driving the second driving unit 208 so that the value of a signal from the second Hall element 210 converges to the value of the correction-position control signal from the second blur correcting controller 204. The first and second driving units 207 and 208 each serve as a driver that drives the blur correcting lens 103 (mobile member).

Since the values of the position signals output from the first and second Hall elements 209 and 210 scatter, the outputs of the first and second Hall elements 209 and 210 are calibrated so that the blur correcting lens 103 moves to a predetermined position in response to a predetermined correction-position control signal. The first and second blur correcting controllers 203 and 204 respectively output correction-position control signals for moving the blur correcting lens 103 to counteract any image blurs based on the vibration information from the first and second vibration detectors 201 and 202. For example, the first and second blur correcting controllers 203 and 204 may produce the correction-position control signals by filtering the vibration information (angular velocity signal). The above operation (blur correcting function) can reduce, to some extent, an image blur even when vibrations such as hand shaking occur in the image pickup apparatus at image pickup.

Figure 2:
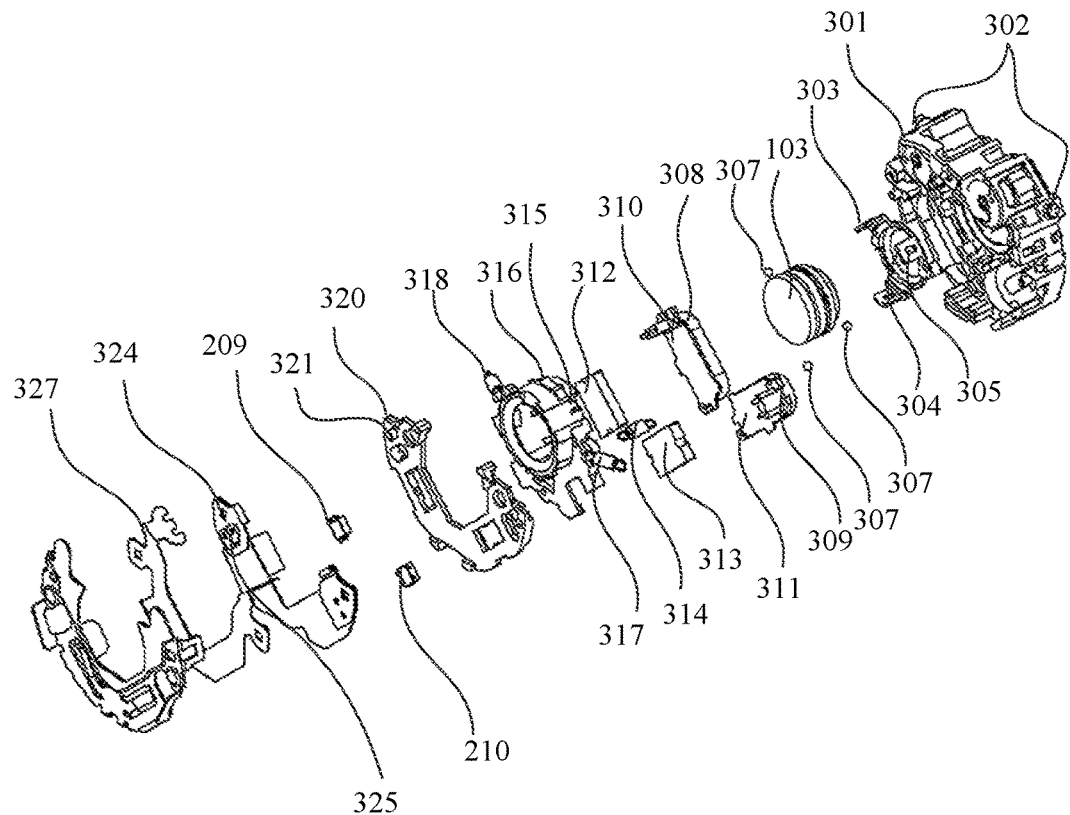
FIG. 2 is an exploded perspective view of an exemplary configuration of a blur correcting mechanism according to a first embodiment of the present invention.

FIG. 2 is an exploded perspective view of a specific exemplary configuration of a blur correcting mechanism corresponding to a diaphragm/shutter-unit driving unit integrated with the blur correcting lens 103 and the blur correcting lens driving unit 104.

A base 301 is a base of the blur correcting mechanism, and the diaphragm/shutter unit and an ND filter mechanism are also fixed onto the base 301. The base 301 is integrally provided with two illustrated follower pins 302 and an unillustrated movable follower pin, and these three follower pins are engaged with three cam grooves in an unillustrated cam barrel outside the base 301 in the radial direction and configured to move in the optical axis direction along the cam grooves.

The blur correcting lens 103 is held by a holder 316 through unillustrated calking clicks. A lens cover 303 has an opening that restricts a light beam passing through the blur correcting lens 103, and is provided with arms 304 at three positions which extend in the optical axis direction from its side surface. The arms 304 each have an opening 305. The openings 305 provided in the arms 304 are engaged with protrusions 315 provided at three positions on the side surface of the holder 316, whereby the lens cover 303 is integrally held by the holder 316. The holder 316 integrally holds magnets 312 and 313 described above.

The holder 316 is pressed against the base 301 through three balls 307, and is movable in an arbitrary direction in a plane orthogonal to the optical axis through rolling of the balls 307. This configuration in which the holder 316 is held through the balls 307 can achieve oscillation with a smaller amplitude and a longer cycle than a configuration in which the holder is guided by a guide bar. This configuration enables the image pickup apparatus including the image sensor having a large number of pixels to provide precise corrections.

The thrust spring 314 is held so that its one end is engaged with the protrusion 315 of the holder 316, and its other end is engaged with an unillustrated protrusion of the base 301 and extended. The thrust spring 314 forces the holder 316 against the base 301. Radial springs 317 and 318 reduce rotation of the holder 316.

Resin bobbins 310 and 311 have integrated metal pins on their heads, to which ends of coils 308 and 309 are tied. A flexible printed circuit (FPC) 324 has its land 325 electrically connected with the pins of the bobbins 310 and 311 by soldering, for example, forming a circuit for supplying an electric power to the coils 308 and 309. The coils 308 and 309 and the magnets 312 and 313 constitute a voice coil motor (VCM) that serves as a driver that drives the blur correcting lens 103 through a driving power due to a magnetic field produced by the magnets and coils.

The first and second Hall elements 209 and 210 (detectors) are disposed near the magnets 312 and 313 attached closer to the mobile member, detect the position of the mobile member through detection of the magnetic fields by the magnets 312 and 313, and output position detection signals (second position signals). However, the above-described configuration in which the coils 308 and 309 and the first and second Hall elements 209 and 210 are disposed close to each other detects not only the magnetic fields of the magnets 312 and 313, but also magnetic fields produced by the coils 308 and 309. This situation degrades the detection accuracy of movement of the magnets by the Hall elements in a frequency region in which the magnetic fields produced by the coils are influential, deteriorating the position control accuracy of a blur correction. The first and second Hall elements 209 and 210 are mounted on the FPC 324 and supplied with an electric power through the FPC 324.

A FPC 327 is a circuit for supplying an electric power to the diaphragm/shutter unit and an ND-filter driving unit. The FPCs 324 and 327 are fixed onto a holder 320 through protrusions 321.

Figure 3A:
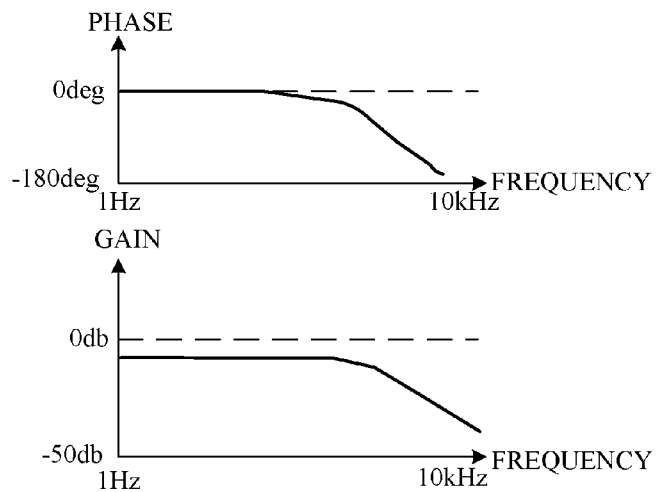
FIGS. 3A, 3S, and 3C are each a Bode plot of a frequency characteristic according to the first embodiment of the present invention.
Figure 3B:
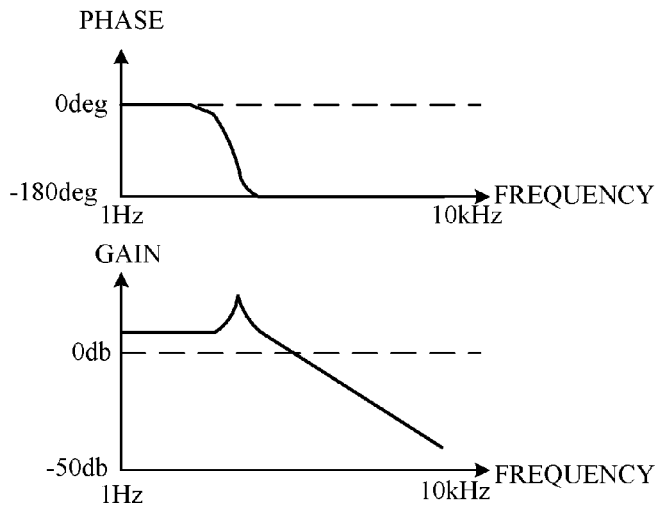
Figure 3C:
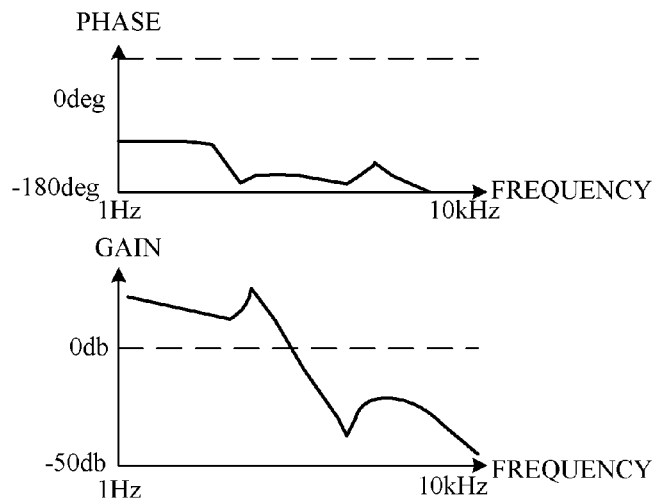

Next follows a description of influence of induced magnetism produced by the coils 308 and 309 on outputs of the Hall elements 209 and 210 with reference to FIGS. 3A, 3B, and 3C. FIG. 3A is a Bode plot representing a frequency characteristic of a relationship between a gain ratio and a phase difference of a Hall element output for a current input to the Hall element output when the frequency of a current flowing through the corresponding coil is changed with the mobile member mechanically fixed. FIG. 3B is a Bode plot representing a frequency characteristic of the Hall element output for a current flowing through the coil having a simple mechanical characteristic with no influence by the induced magnetism. A characteristic of the blur correcting lens driving unit 104 in which the induced magnetism produced by the coil affects the output of the Hall element can be regarded as a characteristic obtained by adding these transfer characteristics illustrated in FIGS. 3A and 3B to each other. As illustrated in FIG. 3A, the influence of the induced magnetism produced by the coil has such a second-order lag characteristic with a low gain in a low frequency band that, from a frequency of near 1 kHz, the gain starts to attenuate at −40 db/dec and the phase starts to retard to −180 degrees. The characteristic in FIG. 3A indicates that, although the mobile member is not actually moved because the magnets attached closer to the mobile member are fixed, when the current flows through the coil, the Hall element provides an output as if it has detected a movement up to a particular frequency. Thus, the Hall element provides an incorrect output for due to the influence of the induced magnetism when the current flows through the coil, although the mobile member does not actually move. Thereby, the position of the mobile member cannot be correctly detected in a high frequency band.

On the other hand, FIG. 3B illustrates the ideal output of the Hall element when the magnets move for the current flowing through the coil. This characteristic is a second-order lag characteristic as well. The blur correcting lens driving unit 104 has an ideal characteristic in which a resonance mode as a mechanical normal frequency exists near 20 Hz and the gain attenuates at a gradient of −40 db/dec in the higher frequency band. Similarly, the phase retards from 0 to −180 degrees at the mechanical normal frequency. FIG. 3C illustrates an open-loop transfer characteristic when a conventional control device in each of the first and second driving controllers 205 and 206 performs a feedback control for the blur correcting lens 103 using a position signal that is made by a parallel addition of the transfer characteristics of FIGS. 3A and 3B and subject to the induced magnetism. The conventional control device may have any configurations, and use a well-known PID control device, for example. A comparison between the gain characteristics in FIGS. 3A and 3B indicates that the mobile member is correctly driven in response to a control output in a frequency band in which a driving characteristic of the mobile member has a high gain in FIG. 3B. Since the detected position of the mobile member by the Hall elements is larger as compared to an output affected by the induced magnetism, the influence of the induced magnetism is small.

At frequencies higher than a frequency (1 kHz approximately) at which the gain characteristics in FIGS. 3A and 3B intersect with each other, the Hall element output (gain) subject to the induced magnetism is larger than a Hall element output (gain) caused by driving of the mobile member, and the influence of the induced magnetism is dominant. Thus, in a lower frequency band, the open-loop characteristic in FIG. 3C illustrates that a control characteristic of the mobile member for which the Hall element output is affected by the induced magnetism produced by the coils is mainly an addition of characteristics of the mobile member and the control device, and thus the influence of the induced magnetism is small. On the other hand, in a high frequency band higher than 1 kHz in which a control output cannot precisely make the mobile member follow (or move to) a target position, the Hall element output subject to the induced magnetism is larger than the Hall element output caused by driving of the mobile member, and thus the gain characteristic has a bulge. The gain temporarily drops in the vicinity of 1 kHz where the gain characteristics intersect with each other and across which the Hall element output caused by driving of the mobile member and the Hall element output subject to the induced magnetism have opposite relationships in magnitude. This is because the Hall element output subject to the induced magnetism and the Hall element output caused by the movement of the mobile member have opposite phases in this vicinity, where signals from the Hall elements having the opposite phases are added to cancel out. This causes the attenuation of the gain characteristic.

As described above, the blur correcting lens driving unit 104 illustrated in FIG. 3C has such a characteristic that in the vicinity of 1 kHz where the influence of the induced magnetism is significant, the Hall element provides an output as if the mobile member is moved although the mobile member does not actually move. A feedback control with this incorrect position signal of the mobile member unnecessarily drives the mobile member, producing high-frequency driving noises. In addition, due to the influence of the induced magnetism, the open-loop transfer characteristic indicates a narrow phase margin for the phase to approach −180 degrees when the gain intersects 0 db, and a narrow gain margin for the gain to approach 0 db when the phase characteristic is −180 degrees. Thereby, a control system becomes unstable and likely to oscillate. It is thus difficult to increase a control gain to make higher a frequency at the gain intersection point in order to improve a control characteristic of the mobile member.

Next follows a description of the configuration of the first and second driving controllers 205 and 206 (the control apparatus) in which the influence of the induced magnetism is reduced by to the present invention.

Figure 4:
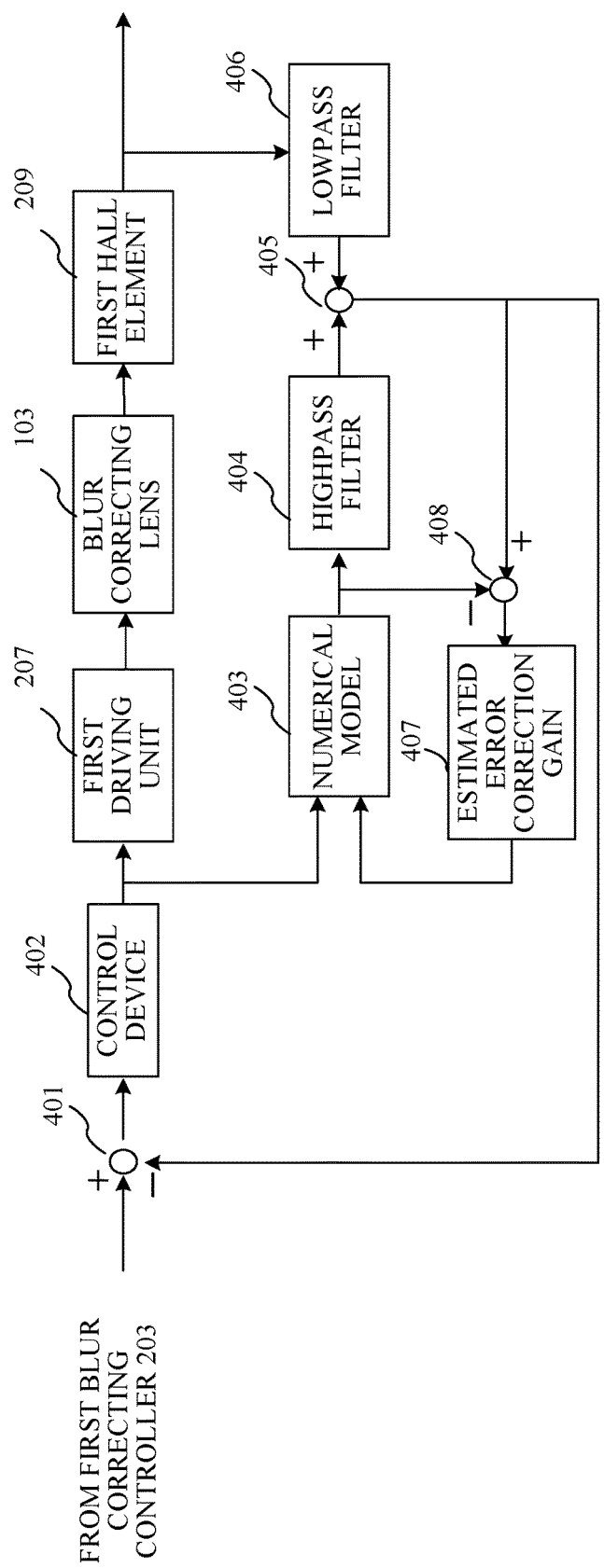
FIG. 4 is a block diagram of an internal configuration of a first driving controller according to the first embodiment of the present invention.

FIG. 4 is a block diagram of an internal configuration of the first driving controller 205. The second driving controller 206 has the same internal configuration as that of the first driving controller 205, and thus a description thereof will be omitted.

Figure 5:
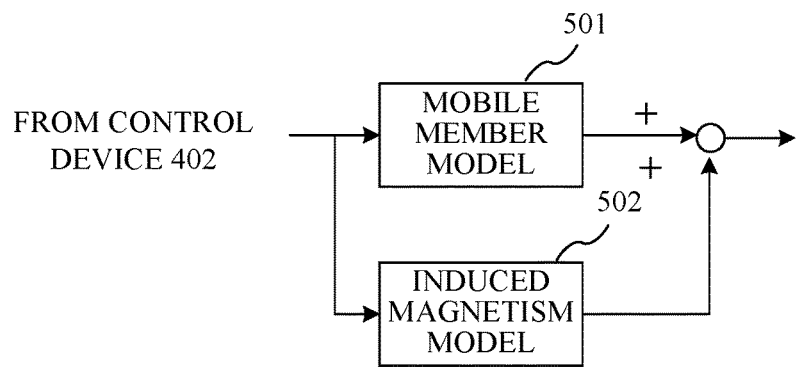
FIG. 5 is a block diagram of a numerical model configuration according to the first embodiment of the present invention.

As illustrated in FIG. 4, an adder 401 adds a target position signal obtained by the first blur correcting controller 203 and a position signal of the blur correcting lens 103 calculated by an adder 405 to each other so as to produce a signal of a deviation between the position of the blur correcting lens 103 and the target position. A control device 402 calculates such a command value to the first driving unit 207 to converge the deviation signal to 0. In other words, the control device 402 serves as a controller that controls the blur correcting lens 103 (mobile member) to move to the target position from the current position. The first driving unit 207 controls the electrification amount to the driving coils 308 and 309 of the blur correcting lens 103 in accordance with the command value so as to control the position of the blur correcting lens 103 to follow the target position. The position information of the blur correcting lens 103 is detected by the first Hall element 209, but this detection signal is affected by the induced magnetism as described above, and thus is an error signal different from an actual lens position in a high frequency band. The first driving controller 205 according to the present invention further includes a numerical model 403. As illustrated in FIG. 5, the numerical model 403 indicates a series of transfer characteristics that a control signal (the control amount) calculated by the control device 402 passes through the first driving unit 207 to drive the blur correcting lens 103 and is detected by the first Hall element 209. This model is expressed by a transfer function of driving of the mobile member in accordance with the control amount calculated by the control device 402. An actual characteristic of the blur correcting lens 103 is affected by the induced magnetism. Thus, assume that a transfer characteristic from the output of the control device 402 to the output of the first Hall element 209 is a characteristic made by a parallel addition of transfer characteristics of a mobile member model 501 representing an ideal mechanical behavior and an induced magnetism model 502 representing the influence of the induced magnetism. The transfer characteristic of the mobile member model 501 is expressed by a transfer function of an s region of a Laplace transform, Expression 1 below.

$$P_{nom} = \frac{K_m}{s^2 + 2\zeta_m \omega_m s + \omega_m^2} \quad (1)$$

$K_m$: gain of the mobile member
$\zeta_m$: attenuation factor of the mobile member
$\omega_m$: eigenfrequency of the mobile member A transfer characteristic of the induced magnetism model 502 is expressed by a transfer function of Expression 2 below.

$$P_{noise} = \frac{K_n}{s^2 + 2\zeta_n \omega_n s + \omega_n^2} \quad (2)$$

$K_n$: gain of the induced magnetic member
$\zeta_n$: attenuation factor of the induced magnetic member
$\omega_n$: eigenfrequency of the induced magnetic member Since the present invention premises that the influence of the induced magnetism is high as compared to the eigenfrequency of the mobile member, a relationship $\omega_m > \omega_n$ is established.

One purpose of the present invention is to estimate a position signal of an ideal mobile member that is not affected by the induced magnetism, based on a signal from the first Hall element 209 affected by the induced magnetism. In the present invention, the estimated position of the ideal mobile member is a calculated position of the mobile member model provided by the numerical model 403 based on an output from the control device 402. The numerical model 403 (estimator) in this embodiment estimates the position of the mobile member based on a control amount in accordance with a difference between the target position output from the control device 402 and the current position, and on the above-described numerical model, and outputs an estimated position signal (first position signal) of the ideal mobile member. This embodiment disposes a highpass filter 404 on the backside of the numerical model 403. The highpass filter 404 (first extractor) is configured to extract a first frequency band of the estimated position signal (first position signal) output from the numerical model 403, which is higher than a predetermined frequency. In other words, the highpass filter 404 serves as an extractor that extracts only a high frequency component of the estimated position signal. A lowpass filter 406 is disposed on the backside of the first Hall element 209. The lowpass filter 406 (second extractor) is configured to extract a second frequency band of the position detection signal (second position signal) output from the first Hall element 209, which is the predetermined frequency. In other words, the lowpass filter 406 serves as an extractor that extracts only a low frequency component of the position detection signal. Provided on the backside of the highpass filter 404 and the lowpass filter 406 is the adder 405 (combiner) that combines the signal extracted by the highpass filter 404 and the signal extracted by the lowpass filter 406. In this manner, the adder 405 adds to each other the signal of the high frequency component extracted from the estimated position of the mobile member through the highpass filter 404, and the signal of the low frequency component extracted from the position detected by the first Hall element 209 through the lowpass filter 406.

The control device 402 uses, for position control, this added signal as a position signal (third position signal) from which the influence of the induced magnetism is removed. In other words, the control device 402 (controller) controls the mobile member to approach to the target position based on the estimated position signal (first position signal) output from the numerical model 403 and the position detection signal (second position signal) output from the Hall elements. More specifically, the control device 402 controls the mobile member based on the signal (third position signal) obtained by combining, through the adder 405, the signal of the high frequency component extracted through the highpass filter 404 and the signal of the low frequency component extracted through the lowpass filter 406. Provided on the rear of the numerical model 403 and the adder 405 are an adder 408 and an estimation error correction gain 407. The adder 408 calculates an error between the position signal in which the influence of the induced magnetism is removed, which is estimated by the adder 405, and the estimated position signal of the mobile member 403. The adder 408 then multiplies this error by the predetermined estimation error correction gain 407, and feeds the multiplied error back to the numerical model 403. In other words, the adder 408 and the estimation error correction gain 407 (calculator) calculate a correction amount of the estimated position signal based on a difference between the estimated position signal (the first position signal) and the position signal (third position signal) in which the influence of the induced magnetism is removed, and outputs the calculated correction amount to the numerical model 403.

Figure 6:
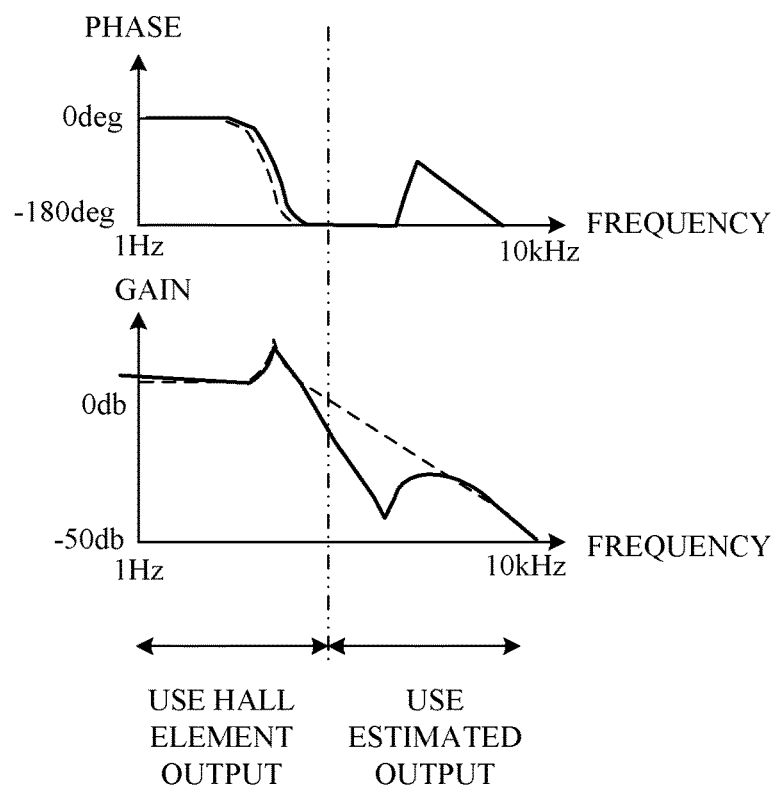
FIG. 6 is a Bode plot illustrating the concept of frequency division of induced magnetism influence removal according to the first embodiment of the present invention.

The numerical model 403 outputs (updates) the estimated position signal based on the control amount output from the control device 402 and the correction amount output from the calculator. The well-known state estimation observer is configured to prevent the position signal estimated by the numerical model 403 from being erroneous due to a modeling error of the numerical model 403 and a characteristic fluctuation of the actual blur correcting lens 103. The state estimation observer according to the present invention calculates a correction input of the mobile member model based on the position signal in which the influence of the induced magnetism is removed and the error of the estimated position signal of the numerical model 403. Thus, the estimated position of the numerical model 403 follows an actual position signal only in a low band component, and an ideal output of the numerical model 403 is used for a high frequency component, which is a characteristic different from that of the conventional observer configuration. This is because the instant configuration assumes that in the frequency characteristic of the first Hall element 209, as illustrated by a solid line in a Bode plot in FIG. 6, the characteristic illustrated of the mobile member is dominant in a low frequency band and the influence of the induced magnetism is dominant in a high frequency band. The state estimation observer according to the present invention uses the output of the actual first Hall element 209 illustrated by the solid line in the low frequency component, and uses the estimated position calculated based on the numerical model 403 illustrated by the dashed line in a high frequency component. These outputs are combined so as to remove only the influence of the induced magnetism present in the high frequency component of the position detection signal of the first Hall element 209. The adder 401 calculates a position deviation by subtracting the target position from the thus generated position signal in which the influence of the induced magnetism has been removed in a high frequency component, and then the control device 402 calculates a control amount based on this position deviation. This configuration removes the influence of the induced magnetism in the feedback control loop, and prevents the control device 402 from outputting an incorrect control amount caused by the induced magnetism. No unnecessary control output caused by the induced magnetism is produced, and thus no unnecessary current to the driving coils 308 and 309 of the first driving unit 207 flows, whereby no induced magnetism is produced.

Figure 7:
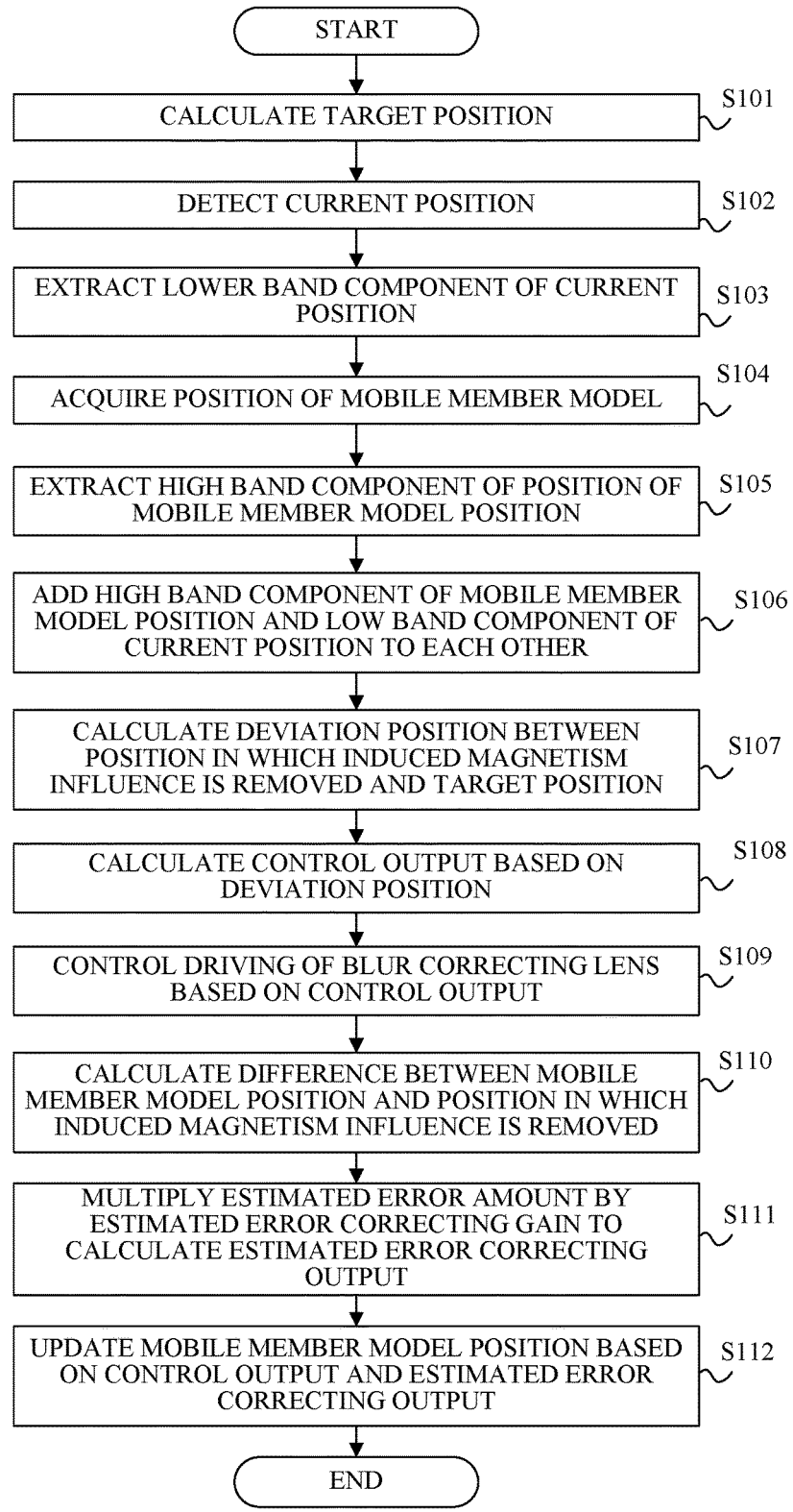
FIG. 7 is a flowchart of a method of controlling a driving apparatus according to the first embodiment of the present invention.

Next follows a description of a control method of the blur correcting lens driving unit 104 using the control apparatus with reference to a flowchart in FIG. 7.

Processing of this flowchart is repeatedly executed by predetermined sampling.

At step S101, the first blur correcting controller 203 calculates a target position of the blur correcting lens 103 based on a vibration signal detected by, for example, a vibration detector.

At step S102, the first Hall element 209 detects a change of a magnetic component produced by the coil 308 and the magnet 312 attached to the first driving unit 207 so to detect the current position of the blur correcting lens 103.

At step S103, the lowpass filter 406 extracts a lower band component from the detected current position.

At step S104, the position of the mobile member model calculated based on the numerical model 403 is acquired.

At step S105, the highpass filter 404 extracts a high band component of the position of the mobile member model.

At step S106, the extracted high band component of the position of the mobile member model and the extracted low band component of the current position are added together to calculate a position signal in which the influence of the induced magnetism has been removed, which is used for a feedback control.

At step S107, an adder 401 calculates a deviation position between the position signal of the blur correcting lens 103 in which the influence of the induced magnetism is removed, which is calculated at step S106, and the target position calculated at step S101.

At step S108, the control device 402 calculates a control output based on the calculated deviation position.

At step S109, the amount of current flowing through the coil 308 in the first driving unit 207 is controlled based on the calculated control output for such a feedback control that the position of the blur correcting lens 103 accords with the target position.

At step S110, the adder 408 calculates a difference between the position signal in which the influence of the induced magnetism is removed, which is calculated at step S106 and the position of the mobile member model acquired at step S104, so as to calculate an error of an estimated position based on the numerical model 403.

At step S111, the calculated amount of an estimated position error is multiplied by the estimation error correction gain 407 so as to calculate a correction output for the estimated error.

At step S112, the position of the mobile member model is updated based on the control output calculated by the control device 402 and the correction output for the estimated error calculated at step S111, so as to estimate the position of the mobile member at the next sample. The position using the numerical model 403 can be estimated by the well-known state estimation observer. A model error and a state variation of the numerical model 403 relative to the actual blur correcting lens 103 are compensated by an estimated error correcting output calculated at step S111. Thus, the estimated error correction gain 407 may be designed to form the well-known Kalman filter, or may be designed by a method such as a pole placement method.

Figure 8A:
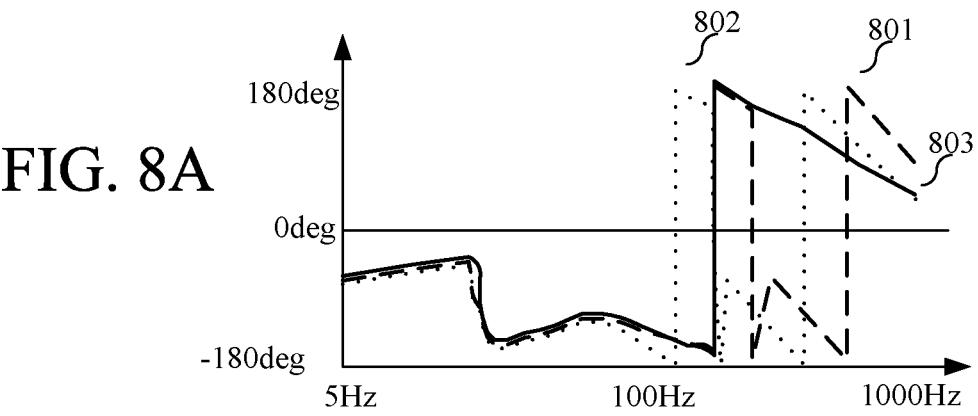
FIGS. 8A and 8B illustrate an open-loop control frequency characteristic according to the first embodiment of the present invention.
Figure 8B:
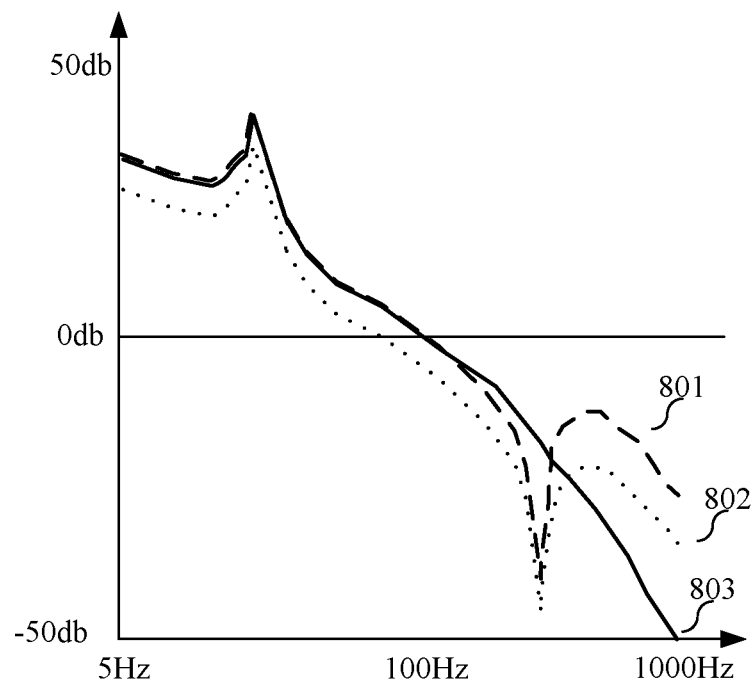

The effect of this embodiment will be described in detail with reference to an exemplary diagram of an open-loop frequency characteristic illustrated in FIGS. 8A and 8B. In FIG. 8, a dashed line 801 is a Bode plot based on the conventional control when a drive control is performed using a position signal subject to the induced magnetism, without using the present invention. A dotted line 802 is a Bode plot based on the conventional control designed with taken into account the influence of the induced magnetism. A solid line 803 is a Bode plot for the drive control according to the present invention. Each Bode plot illustrates an open-loop frequency characteristic including a mechanical characteristic of the blur correcting lens and a characteristic added by the control device 402. FIG. 8A illustrates a phase characteristic, and FIG. 8B illustrates a gain characteristic.

A horizontal axis represents the frequency, and a vertical axis represents the phase (deg) and gain (db). The open-loop frequency characteristic according to the conventional control method is such that the position signal detected by the Hall elements changes depending on the influence of the induced magnetism in a frequency band equal to or higher than 100 Hz as illustrated by the dashed line 801. In other words, in the feedback control loop, the position signal detected by the Hall elements is varied by the control output under the influence of the induced magnetism, although the position of the mobile member does not actually change. Since an actually unnecessary control output occurs, the gain characteristic becomes higher at a high frequency (near 1 kHz). Due to this bulge in the gain in the high frequency, large noises occur in an audible range when the mobile member is driven. In addition, the entire control gain cannot be increased so as to avoid instability (narrow gain margin) of the control system which causes the gain to become close to 0 db due to the gain increase in a high frequency in which the phase is retarded by −180 degrees or less. Thus, when the driving apparatus having such a control characteristic is applied to the image pickup apparatus, driving noises of the driving apparatus may be recorded through a microphone in a camera in recording a motion image, the control performance may deteriorate, and the blur correcting effect may decrease.

The dotted line 802 illustrates the open-loop characteristic according to the conventional control in which the control device is designed with taken into account the influence of the induced magnetism. The characteristic illustrated by the dotted line 802 can be obtained, for example, by providing a lowpass filter (LPF) configured to attenuate a high frequency signal on the output stage of the control device 402 so as to avoid the gain increase in the high frequency. Owing to the LPF, the gain effectively attenuates at a frequency near 1 kHz more than that of conventional control. However, as an adverse effect, the phase retards largely near 100 Hz due to the addition of the LPF, and thus the control stability (phase margin) deteriorates at a zero-crossing point of the gain. Then, in order to sufficiently secure the phase margin, the gain needs to be decreased for the entire control system so as to shift the zero-crossing frequency to a lower band. Accordingly, the entire gain is decreased, a control bandwidth becomes narrower, and the control performance deteriorates.

A description will now be given of the control characteristic according to the present invention using the solid line 803. In the present invention, the characteristic at a low frequency coincides with the same gain and phase characteristics as those of the dashed line 801 since a position detected by the actual Hall elements is used in the low frequency. However, the characteristic at a high frequency of 100 Hz or higher using the estimated position with reduced influence of the induced magnetism, which is estimated using the numerical model 403, for the feedback control, is different from the dashed line 801. In other words, since the influence of the induced magnetism is removed in the feedback loop, no unnecessary control output is produced at the high frequency, and no gain increase caused by the influence of the induced magnetism is produced. Moreover, a gain decrease amount at the high frequency near 1 kHz can be more effectively restrained than that in the conventional control that considers the influence of the induced magnetism, and thus the driving noises at the high frequency caused by the influence of the induced magnetism can be significantly improved. Different from case where the LPF is simply added to the control output so as to remove all signals at the high frequency, the control output near the zero-crossing frequency is calculated for an ideal mobile member characteristic based on the mobile member model and then output, and thus the phase does not significantly retard at the high frequency. This control can secure the stability (phase margin) of the control system.

As described above, the method according to the present invention reduces the influence of the induced magnetism at high frequency, which is a conventional problem, without degrading the control performance caused by the reduction of the control gain, and can secure a control margin enough to prevent the oscillation phenomenon caused by the more unstable control system. This configuration can secure the control performance of the driving apparatus affected by the induced magnetism and improve the blur correcting performance. Since it is unnecessary to provide the Hall element and the magnet so as to reduce the influence of the induced magnetism, and the apparatus can be made smaller. Moreover, since it is unnecessary to provide the magnet for the Hall elements or to enlarge or thicken the magnet so as to reduce the influence of the induced magnetism, the apparatus can be made less expensive.

Since the present invention uses only a numerical model to reduce the influence of the induced magnetism in the feedback control loop, it is unnecessary to consider a detailed model for the influence of the induced magnetism provided to the Hall element output by the control output. Thus, the present invention is not affected by the fluctuations of the induced magnetism characteristic and scattering in mechanical configuration. For example, the conventional method previously sets a Q value at an inflection frequency of the influence of the induced magnetism and an inflection point of the actuator. If the set characteristic of the induced magnetism is different from the actual one, the influence of the induced magnetism cannot be completely removed and negatively affects the control.

In the conventional control method of completely removing the influence of the induced magnetism based on the Hall element output, the characteristic in which the influence of the induced magnetism is removed becomes closer to the original mechanical characteristic of the mobile member, and the gain becomes high at the high frequency, which produces driving noises or reduces the gain margin. In other words, it is difficult for the conventional method to improve the driving characteristic at the high frequency. On the other hand, the method according to the present invention can freely design the frequency at which the actually detected, position signal and the estimated value based on a numerical model are combined with each other, in designing the HPF 404 and the LPF 406.

In other words, the present invention can adjust the cutoff frequencies (predetermined frequencies) in the HPF 404 and the LPF 406. By adjusting the cutoff frequencies, the first frequency band extracted through the HPF 404 and the second frequency band extracted through the LPF 406 can be adjusted. The cutoff frequencies can be adjusted depending on the driving condition of the mobile member. Thus, when the influence of the induced magnetism does not need to be completely removed, the cutoff frequencies of the HPF 404 and the LPF 406 are adjusted so that a synthesis frequency of the actual position and the estimated position is about 300 Hz around which the induced magnetism on the Hall element output is influential. In other words, the first frequency band may be set to be smaller than the second frequency band so as not to completely remove the influence of the induced magnetism produced by the coils. In this manner, it is possible to perform such designing to attenuate the gain near 1000 Hz while maintaining the control margin, by using a characteristic in which the phase advances at the high frequency due to the influence of the induced magnetism, instead of completely removing the induced magnetism.

In this manner, the control gain can be increased while driving noises at the high frequency can be reduced and the control margin is secured. Thereby, the blur correcting performance can be improved.

When removing driving noises of the mobile member is prioritized, the cutoff frequency may be adjusted to a lower band. When a control response of the mobile member is prioritized, the cutoff frequency may be adjusted to a higher band. In other words, when removing of driving noises of the mobile member is prioritized, the first frequency band may be set wider than the second frequency band. When the control response of the mobile member is prioritized, the second frequency band may be set wider than the first frequency band.

According to the present invention, an induced magnetism influence reducer that reduces the influence of the induced magnetism on the feedback control of the mobile member can maintain the stability of control and improve the control performance without increasing the driving noises of the mobile member at the high frequency.

The present invention provides the control apparatus that can precisely control the mobile member even when the Hall elements detect the induced magnetism produced from the coils.

While the present invention has been described with reference to exemplary embodiments, it is to be understood that the invention is not limited to the disclosed exemplary embodiments. For example, although this embodiment describes case where the present invention is applied to a blur correcting control apparatus in the image pickup apparatus, the present invention is applicable to detecting the position of the driving apparatus by magnetism detection using magnets and coils.

This embodiment also describes the method of dividing actual position detection information based on the Hall element output and the estimated position based on the numerical model into two regions, i.e., low and high frequencies, and of combining them. However, the number of frequencies for the combination is not limited to two, and the present invention is applicable to a division into a plurality of frequencies and combination thereof.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The control apparatus according to the present invention is preferably applicable to an interchangeable lens (optical apparatus) and an image pickup apparatus which are used for a compact digital camera, a single-lens reflex camera, and a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-007502, filed on Jan. 19, 2015, which is hereby incorporated by reference herein in its entirety.

What is claimed is:

1. An optical apparatus comprising:
   an estimator configured to estimate a position of a blur correcting lens based on a control amount in accordance with a difference between a target position and a current position, and a numerical model, and to output a first position signal;
   a first extractor configured to extract a first frequency band of the first position signal, which is higher than a predetermined frequency;
   a second extractor configured to extract a second frequency band of a second position signal that is output from a detector configured to detect the position of the blur correcting lens, which is equal to or lower than the predetermined frequency;
   a combiner configured to combine a signal extracted by the first extractor and a signal extracted by the second extractor; and a controller configured to control driving of the blur correcting lens to move to the target position based on a third position signal combined by the combiner.

2. The optical apparatus according to claim 1, wherein the first extractor is a highpass filter, and the second extractor is a lowpass filter.

3. The optical apparatus according to claim 1, further comprising a calculator configured to calculate a correction amount of the first position signal based on a difference between the first position signal and the third position signal.

4. The optical apparatus according to claim 3, wherein the estimator outputs the first position signal based on the control amount and the correction amount.

5. The optical apparatus according to claim 1, wherein the controller adjusts the first frequency band and the second frequency band by adjusting the predetermined frequency.

6. The optical apparatus according to claim 5, wherein the controller:
   changes the predetermined frequency to a lower frequency so as to remove driving noises of the blur correcting lens; and
   changes the predetermined frequency to a higher frequency so as to maintain a control response of the blur correcting lens.

7. The optical apparatus according to claim 1, wherein the numerical model is expressed as a transfer function relating to driving of the blur correcting lens in accordance with the control amount.

8. A method of controlling a blur correcting lens, the method comprising:
- an estimating step of estimating a position of the blur correcting lens based on a control amount in accordance with a difference between a target position and a current position, and a numerical model, and outputting a first position signal;
- a first extracting step of extracting a first frequency band of the first position signal, which is higher than a predetermined frequency;
- a second extracting step of extracting a second frequency band of a second position signal that is output from a detector configured to detect the position of the blur correcting lens, which is equal to or lower than the predetermined frequency;
- a combining step of combining a signal extracted by the first extracting step and a signal extracted by the second extracting step with each other so as to produce a third position signal; and
- a control step of controlling driving of the blur correcting lens to move to the target position based on the third position signal combined by the combining step.

9. A non-transitory computer-readable storage medium storing a program that causes a computer to execute a process comprising:
- an estimating step of estimating a position of a blur correcting lens based on a control amount in accordance with a difference between a target position and a current position, and a numerical model, and outputting a first position signal;
- a first extracting step of extracting a first frequency band of the first position signal, which is higher than a predetermined frequency;
- a second extracting step of extracting a second frequency band of a second position signal that is output from a detector configured to detect the position of the blur correcting lens, which is equal to or lower than the predetermined frequency;
- a combining step of combining a signal extracted by the first extracting step and a signal extracted by the second extracting step with each other so as to produce a third position signal; and
- a control step of controlling driving of the blur correcting lens to move to the target position based on the third position signal combined by the combining step.

* * * * *